(12) United States Patent
Wei (10) Patent No.: US 12,391,209 B2
(45) Date of Patent: Aug. 19, 2025

(54) SAFETY BELT RETRACTING AND LOCKING APPARATUS AND AUTOMOBILE SEAT

(71) Applicant: Autoliv Development AB, Vargarda (SE)

(72) Inventor: Kezhao Wei, Shanghai (CN)

(73) Assignee: AUTOLIV DEVELOPMENT AB, Vargarda (SE)

(*) Notice: Subject to any disclaimer, the term of this patent is extended or adjusted under 35 U.S.C. 154(b) by 0 days.

(21) Appl. No.: 18/690,553

(22) PCT Filed: Jul. 15, 2022

(86) PCT No.: PCT/CN2022/105849
§ 371 (c)(1),
(2) Date: Mar. 8, 2024

(87) PCT Pub. No.: WO2023/035771
PCT Pub. Date: Mar. 16, 2023

(65) Prior Publication Data
US 2025/0136040 A1  May 1, 2025

(30) Foreign Application Priority Data
Sep. 13, 2021 (CN) .......................... 202111067644.9

(51) Int. Cl.
*B60R 22/26* (2006.01)
*B60R 22/343* (2006.01)
(Continued)

(52) U.S. Cl.
CPC ............ *B60R 22/343* (2013.01); *B60R 22/26* (2013.01); *B60R 22/40* (2013.01); *B60R 22/46* (2013.01); *B60R 2022/4666* (2013.01)

(58) Field of Classification Search
CPC ....... B60R 22/343; B60R 22/26; B60R 22/40; B60R 22/46; B60R 2022/4666
See application file for complete search history.

(56) References Cited

U.S. PATENT DOCUMENTS 3,897,913 A * 8/1975 Hall ........................ B60R 22/40
242/384.1
5,495,994 A * 3/1996 Rumpf .................... B60R 22/40
242/384.6
(Continued)

FOREIGN PATENT DOCUMENTS

CN        204279339 U  *  4/2015
CN        109177916 A      1/2019
(Continued)

OTHER PUBLICATIONS

Cai, A Can With Seat Turning Belt, Apr. 22, 2015, EPO, CN 204279339 U, Machine Translation of Description (Year: 2015).*

*Primary Examiner* — Paul N Dickson
*Assistant Examiner* — Matthew D Lee
(74) *Attorney, Agent, or Firm* — DICKINSON WRIGHT PLLC (57) ABSTRACT

A seat belt retracting and locking apparatus and an automotive seat including a seat belt retractor, a sensor having a sensing seat and a sensing ball, and a locking mechanism. When the locking mechanism is in a locking state, the sensing seat is fixed in an initial position. When the locking mechanism is in an unlocking state, the sensing seat is rotatable. When the seat belt retracting and locking apparatus and the automotive seat are in a normal state, the sensing seat is locked in the initial position by the locking mechanism, and the angle and the position of the sensing seat are not affected by a change in the speed of a vehicle, so that relative positions between the sensing ball, a pawl, and a (Continued)

ratchet do not change, thereby improving the stability of the performance of the apparatus and seat.

18 Claims, 10 Drawing Sheets

(51) Int. Cl.
  *B60R 22/40* (2006.01)
  *B60R 22/46* (2006.01)

(56) References Cited

U.S. PATENT DOCUMENTS

| | | | |
|---|---|---|---|
| 6,196,633 B1 * | 3/2001 | Yamamoto | B60R 22/41 297/480 |
| 6,578,419 B1 * | 6/2003 | Murayama | G01P 1/00 242/384.6 |
| 2003/0052210 A1 * | 3/2003 | Smithson | B60R 22/40 242/383 |
| 2003/0234310 A1 * | 12/2003 | Kielwein | B60R 22/40 242/384.6 |
| 2009/0033084 A1 * | 2/2009 | Sorensen | B60R 22/40 280/806 |
| 2019/0217814 A1 * | 7/2019 | Jaradi | B60R 22/343 |

FOREIGN PATENT DOCUMENTS

| | | | | |
|---|---|---|---|---|
| CN | 212654311 U | * | 3/2021 | B60R 22/34 |
| CN | 118597045 A | * | 9/2024 | |
| DE | 102020209902 B3 | * | 12/2021 | B60R 22/36 |
| EP | 0067322 A1 | | 12/1982 | |
| JP | 2001080461 A | * | 3/2001 | B60R 21/01 |
| KR | 19990085379 A | | 12/1999 | |
| KR | 20040104019 A | | 12/2004 | |
| WO | WO-2018142872 A1 | * | 8/2018 | B60R 22/40 |
| WO | WO-2019082561 A1 | * | 5/2019 | |

* cited by examiner

SAFETY BELT RETRACTING AND LOCKING APPARATUS AND AUTOMOBILE SEAT

The present application claims the priority of Chinese Patent Application No. 202111067644.9 filed on 13 Sep. 2021, which is incorporated herein by reference in its entirety.

TECHNICAL FIELD

The present invention relates to the technical field of sensing instruments for seat belts, and in particular to a seat belt retracting and locking apparatus and an automotive seat.

BACKGROUND

Figure 1:
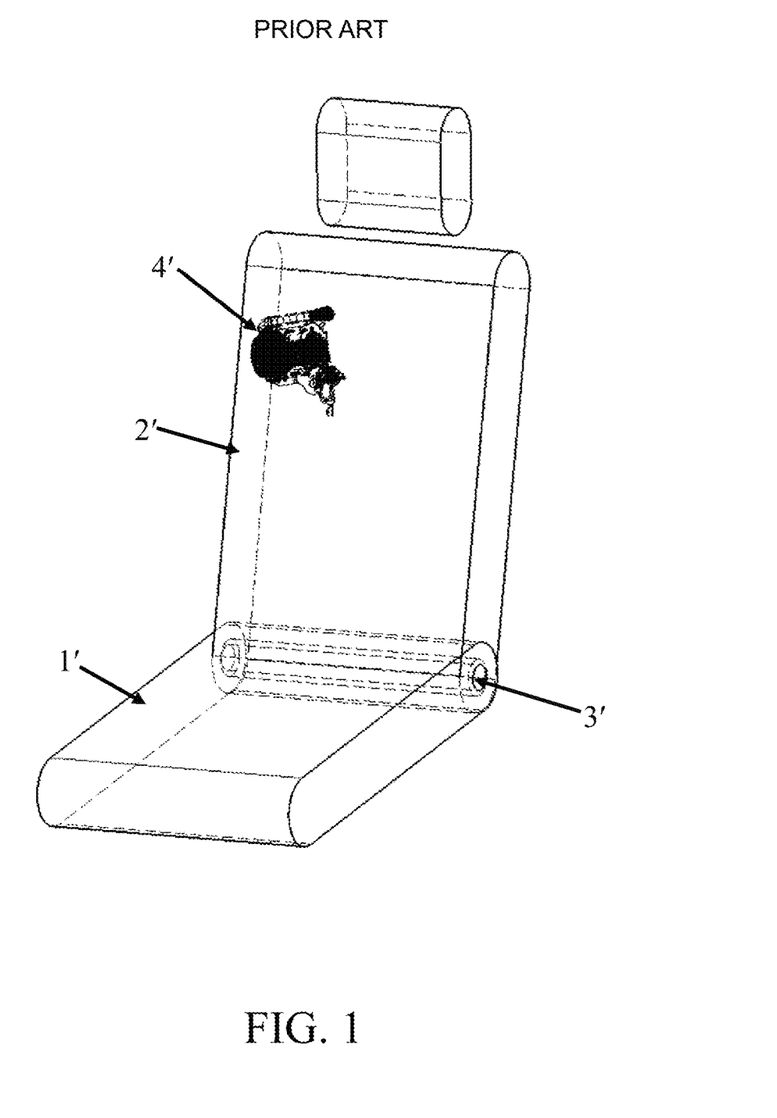
FIG. 1 is a schematic diagram of a seat belt retracting and locking apparatus mounted in a seat back in the prior art.
Figure 2:
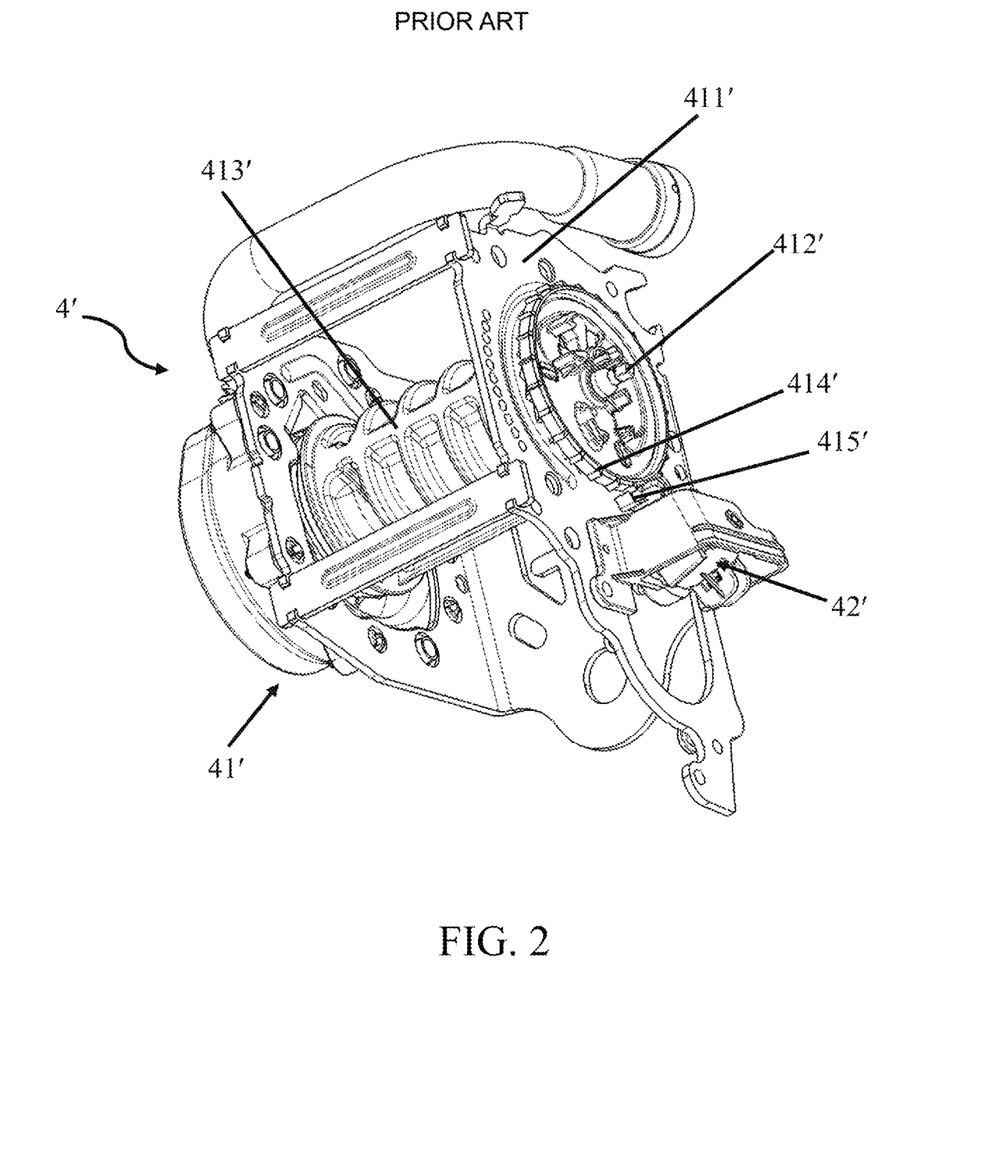
FIG. 2 is a schematic structural diagram of a seat belt retracting and locking apparatus in the prior art.

As shown in FIGS. 1-2, for some vehicle models, a seat belt retracting and locking apparatus 4' is mounted in a seat back 2', and is specifically mounted on a backrest frame of the seat back 2'. The seat back 2' is connected to a seat cushion 1' by means of a rotary shaft 3'. The seat back 2' may rotate relative to the seat cushion 1' to adjust an angle.

The seat belt retracting and locking apparatus 4' includes a seat belt retractor 41' and a sensor 42'. The seat belt retractor 41' includes a reel housing 411', a core shaft 412', a seat belt reel 413', a ratchet 414', and a pawl 415'. The core shaft 412' is mounted on the reel housing 411'. The seat belt reel 413' is sleeved on the core shaft 412'. The ratchet 414' is located outside of the reel housing 411'. The ratchet 414' is sleeved on the core shaft 412'. The ratchet 414' is connected to one end of the seat belt reel 413'. The ratchet 414' and the seat belt reel 413' can rotate synchronously on the core shaft 412'. The pawl 415' is located outside of the reel housing 411', and is connected to the reel housing 411' by means of a pawl pivot shaft. After the pawl 415' is triggered, the pawl 415' can rotate about the pawl pivot shaft, so as to engage with the ratchet 414' to prevent the ratchet 414' from rotating, thereby preventing the seat belt reel 413' from rotating.

The sensor 42' includes a sensing seat and a sensing ball located in a recessed cavity of the sensing seat. The sensing seat is connected to the reel housing 411' by means of a sensing seat pivot shaft. The sensor 42' may be mounted by means of a support. The sensing seat can rotate back and forth on the sensing seat pivot shaft.

In a normal state, the sensor 42' naturally sags, and the pawl 415' rests on the sensing ball. The pawl 415' is separated from the ratchet 414'. The seat belt reel 413' can rotate normally.

In emergency situations such as when a vehicle suddenly slows down or tilts, the sensing ball leaves an initial position due to inertia and pushes up the pawl 415'. The pawl 415' rotates about the pawl pivot shaft. One end of the pawl 415' having teeth turns upwards and engages with the ratchet 414', so that the seat belt reel 413' cannot continue to rotate, so as to prevent the seat belt from being pulled out, thereby better protecting an occupant.

The sensor 42' in the prior art is connected to the rotary shaft 3' of the seat back 2' by means of a synchronizer, and the angle of the sensor 42' changes accordingly as the angle of the seat back 2' is adjusted.

When the angle of the seat back 2' is adjusted, the angle and/or the position of the sensor 42' may change due to an error of the synchronizer, thereby affecting normal performance of the sensor 42'.

SUMMARY

An objective of the present invention is to provide a seat belt retracting and locking apparatus and an automotive seat. In a normal state, a sensing seat is locked in an initial position by a locking mechanism, so that the angle or the position thereof are not affected by a change in the speed of a vehicle. When the angle of a seat back is adjusted, the locking mechanism unlocks the sensing seat, and the vehicle sensing seat always remains in the initial position, so that relative positions between a sensing ball, a pawl, and a ratchet do not change, thereby ensuring the stability of the performance of the product.

Provided in the technical solution of the present invention is a seat belt retracting and locking apparatus for being mounted in a seat back, comprising a seat belt retractor, a sensor having a sensing seat and a sensing ball, and a locking mechanism for locking the sensing seat, the seat belt retractor comprising a retractor housing for being connected to a backrest frame of the seat back, a core shaft mounted on the retractor housing, a seat belt reel sleeved on the core shaft, a ratchet located outside of the retractor housing and synchronously rotating with the seat belt reel, and a pawl pivotally mounted outside of the retractor housing and capable of being triggered by the sensing ball to lock the ratchet, the sensing seat being connected to the retractor housing by means of a first pivot shaft, the sensing seat having an accommodating recess, the sensing ball being at least partially located in the accommodating recess, an abutting portion of the pawl resting on the sensing ball, the sensing seat having an initial position, the center of gravity of the sensing seat in the initial position being located directly below the axis of the first pivot shaft, the locking mechanism being mounted on the retractor housing, and being located on one side of the sensor, the locking mechanism having a locking state of locking the sensing seat when the seat back is locked and an unlocking state of unlocking the sensing seat when the angle of the seat back is adjusted, when the locking mechanism is in the locking state, the sensing seat being fixed in the initial position, and when the locking mechanism is in the unlocking state, the sensing seat being rotatable relative to the axis of the first pivot shaft, and the sensing seat remaining in the initial position.

In an optional technical solution, a counterweight block is mounted in the sensing seat, and the counterweight block is located directly below the axis of the first pivot shaft, and when the locking mechanism is in the unlocking state, the counterweight block causing the sensing seat to remain in the initial position.

In an optional technical solution, when the sensing ball is in a static state in the accommodating recess, the center of gravity of the sensing ball is located directly above the counterweight block.

In an optional technical solution, a side of the sensing seat facing away from the accommodating recess is provided with a curved rack, and the counterweight block is located between two ends of the curved rack, the locking mechanism being located on one side of the sensing seat, the locking mechanism comprising an extensible locking pin and a driving member for driving the locking pin to move towards a side of the sensing seat, an end portion of the locking pin facing the curved rack having locking pin teeth, when the locking pin teeth engage with the curved rack, the locking mechanism locking the sensing seat, and when the locking pin teeth are separated from the curved rack, the locking mechanism unlocking the sensing seat.

In an optional technical solution, the driving member is an elastic element, when the elastic element is in a compressed state, the locking pin being separated from the curved rack, and when the elastic element is in a released state, the locking pin mating with the curved rack.

In an optional technical solution, the seat belt retracting and locking apparatus further comprises an electromagnetic actuator for driving the elastic element to switch between the compressed state and the released state, the electromagnetic actuator comprising an electromagnet capable of compressing the elastic element when powered on and a controller for being connected to a vehicle computer and capable of controlling the electromagnet to be powered on and off, in a normal state, the electromagnet being in a powered-off state, and the elastic element being in the released state, and when the controller receives an angle adjustment signal of the seat back transmitted by the vehicle computer, the controller controlling the electromagnet to be powered on, and causing the elastic element to be in the compressed state.

In an optional technical solution, the seat belt retracting and locking apparatus further comprises a pulling cord for being connected between a rotation shaft of a seat adjuster and the locking pin, when the seat adjuster is in a locked state, the elastic element being in the released state, and the locking pin mating with the curved rack, and when the seat adjuster is in an unlocked state, the pulling cord pulling the locking pin to leave the curved rack, and causing the elastic element to be in the compressed state.

In an optional technical solution, the curved rack has a first end and a second end arranged opposite each other, the distance between the counterweight block and the first end being less than the distance between the counterweight block and the second end, when the seat back is in a vertical state, the locking pin being located below the curved rack and facing the counterweight block, and when the seat back is in a state of being laid down backwards to be horizontal, the locking pin being located at a front side of the curved rack and facing the second end.

In an optional technical solution, the pawl is connected to the retractor housing by means of a second pivot shaft, the first pivot shaft being parallel to a rotary shaft of the seat back, and the second pivot shaft and the core shaft being respectively parallel to the first pivot shaft.

Further provided in a technical solution of the present invention is an automotive seat, comprising a seat back and the seat belt retracting and locking apparatus according to any one of the foregoing technical solutions, the retractor housing being fixedly connected to a backrest frame of the seat back, when the seat back is locked, the locking mechanism locking the sensing seat, and when the angle of the seat back is adjusted, the locking mechanism unlocking the sensing seat.

By using the above technical solutions, the following beneficial effects are achieved:

in the seat belt retracting and locking apparatus and the automotive seat provided by the present invention, in a normal state, the sensing seat is locked in the initial position by the locking mechanism, so that the angle and the position of the sensing seat are not affected by a change in the speed of a vehicle.

When the vehicle operates normally, the pawl is separated from the ratchet, and the seat belt retractor can operate normally. In emergency situations such as when the vehicle brakes sharply or tilts, the sensing ball moves forwards and upwards along a recess wall of the accommodating recess due to inertia, thereby triggering the pawl and causing the pawl to engage with the ratchet, so that the seat belt reel cannot continue to rotate, so as to prevent the seat belt from being pulled out, thereby providing a protective effect.

When the angle of the seat back is adjusted, the seat belt retractor and the locking mechanism rotate together with the seat back. However, the sensing seat always remains in the initial position, and the sensing ball is substantially still, so that relative positions between the sensing ball, the pawl, and the ratchet do not change, thereby improving the stability of the performance of the product.

DETAILED DESCRIPTION

Specific embodiments of the present invention are described further below with reference to the accompanying drawings. The same parts are denoted by the same reference numerals. It should be noted that the words "front," "rear," "left," "right," "upper" and "lower" used in the following description refer to directions in the accompanying drawings, and the words "inner" and "outer" each refer to a direction towards or away from the geometric center of a particular component.

As shown in FIGS. 2-9 in conjunction with FIGS. 13-16, a seat belt retracting and locking apparatus 100 for being mounted in a seat back 301 provided by an embodiment of the present invention includes a seat belt retractor 1, a sensor 2 having a sensing seat 21 and a sensing ball 22, and a locking mechanism 3 for locking the sensing seat 21.

Figure 3:
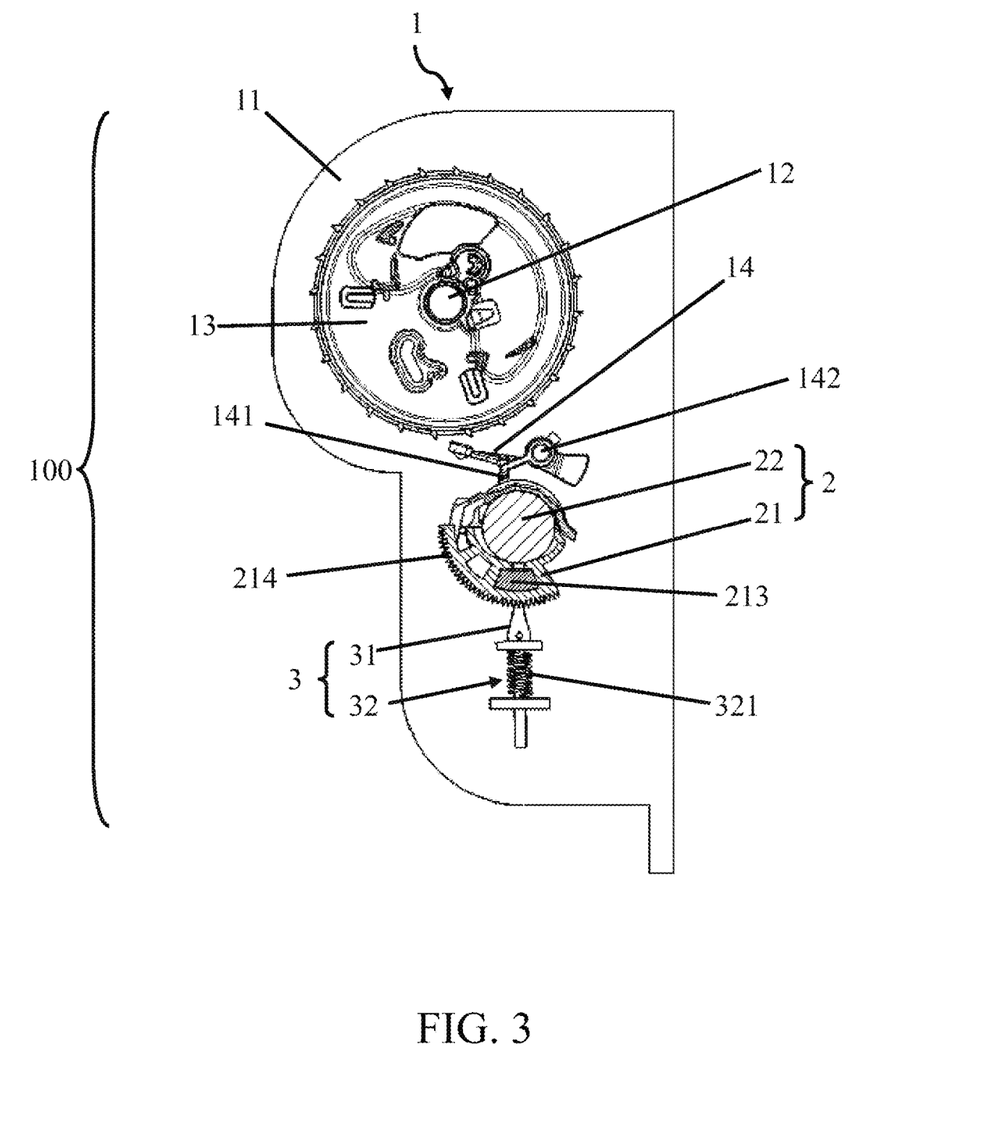
FIG. 3 is a schematic diagram of the relative positions of a locking mechanism, a sensor, a pawl, and a ratchet when a seat back is in a vertical state and the locking mechanism locks a sensing seat.

The seat belt retractor 1 includes a retractor housing 11 for being connected to a backrest frame of the seat back 301, a core shaft 12 mounted on the retractor housing 11, a seat belt reel (not shown in the drawings) sleeved on the core shaft 12, a ratchet 13 located outside of the retractor housing 11 and synchronously rotating with the seat belt reel, and a pawl 14 pivotally mounted outside the retractor housing 11 and capable of being triggered by the sensing ball 22 to lock the ratchet 13.

The sensing seat 21 is connected to the retractor housing 11 by means of a first pivot shaft 212.

The sensing seat 21 is provided with an accommodating recess 211, and the sensing ball 22 is at least partially located in the accommodating recess 211.

An abutting portion 141 of the pawl 14 rests on the sensing ball 22.

The sensing seat 21 has an initial position, and the center of gravity of the sensing seat 21 in the initial position is located directly below the axis of the first pivot shaft 212.

The locking mechanism 3 is mounted on the retractor housing 11, and is located on one side of the sensor 2. The locking mechanism 3 has a locking state of locking the sensing seat 21 when the seat back 301 is locked and an unlocking state of unlocking the sensing seat 21 when the angle of the seat back 301 is adjusted.

When the locking mechanism 3 is in the locking state, the sensing seat 21 is fixed in the initial position.

Figure 4:
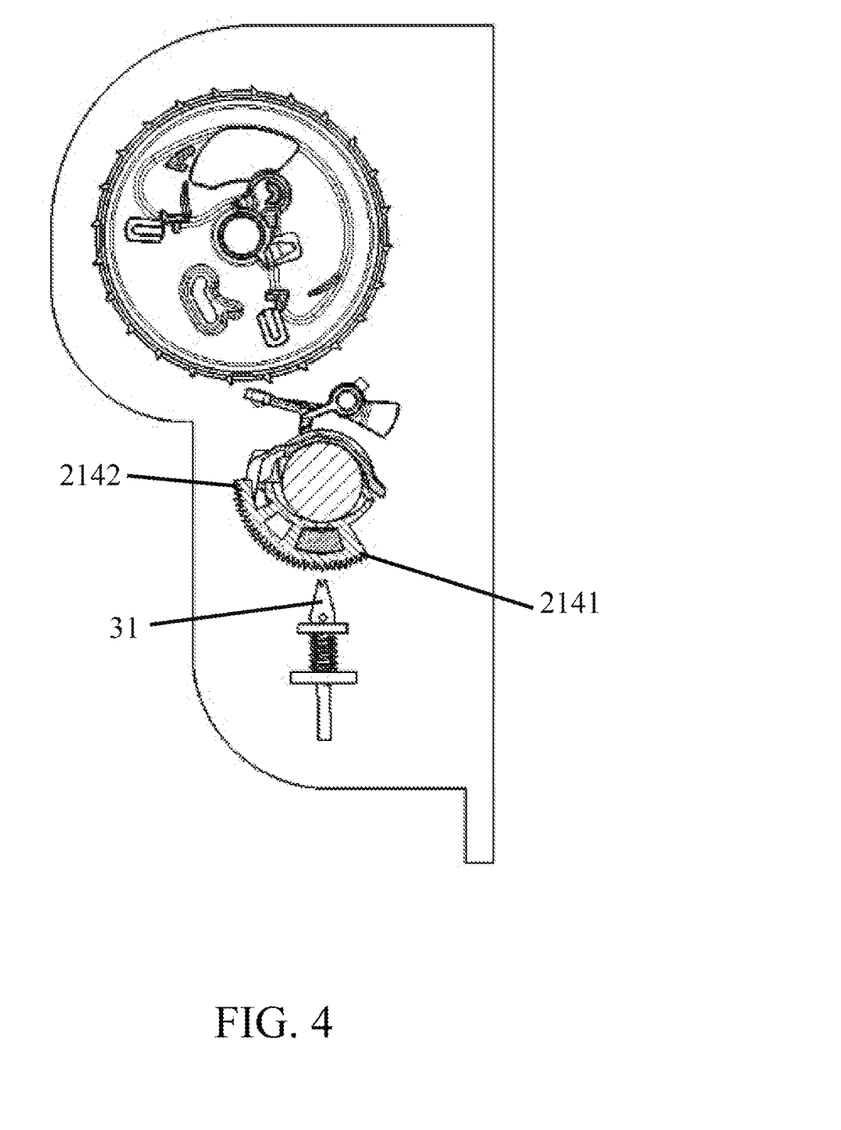
FIG. 4 is a schematic diagram of the relative positions of a locking mechanism, a sensor, a pawl, and a ratchet when a seat back is in a vertical state and the locking mechanism unlocks a sensing seat.
Figure 5:
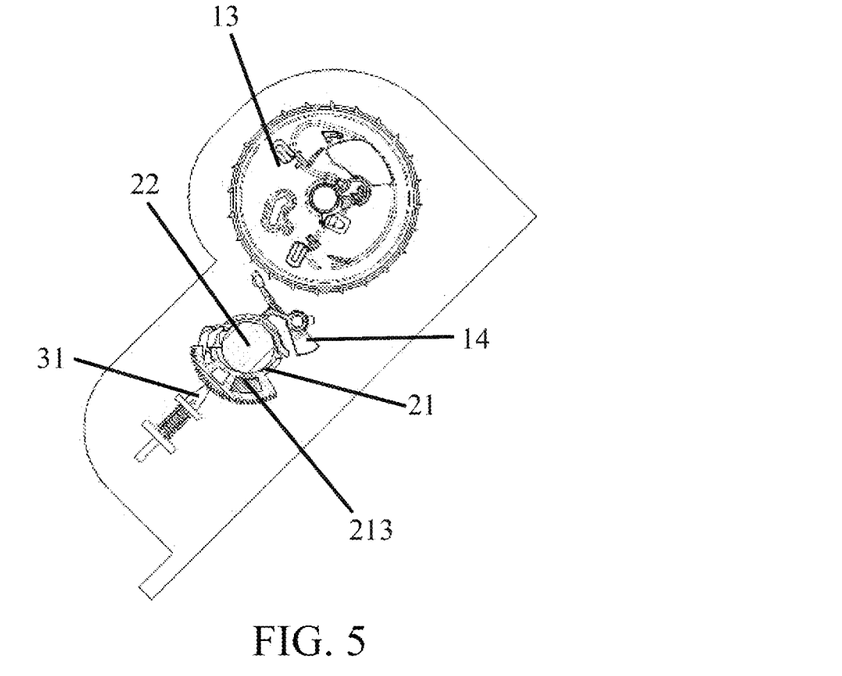
FIG. 5 is a schematic diagram of the relative positions of a locking mechanism, a sensor, a pawl, and a ratchet when a seat back is in a state of tilting backwards and the locking mechanism locks a sensing seat.
Figure 6:
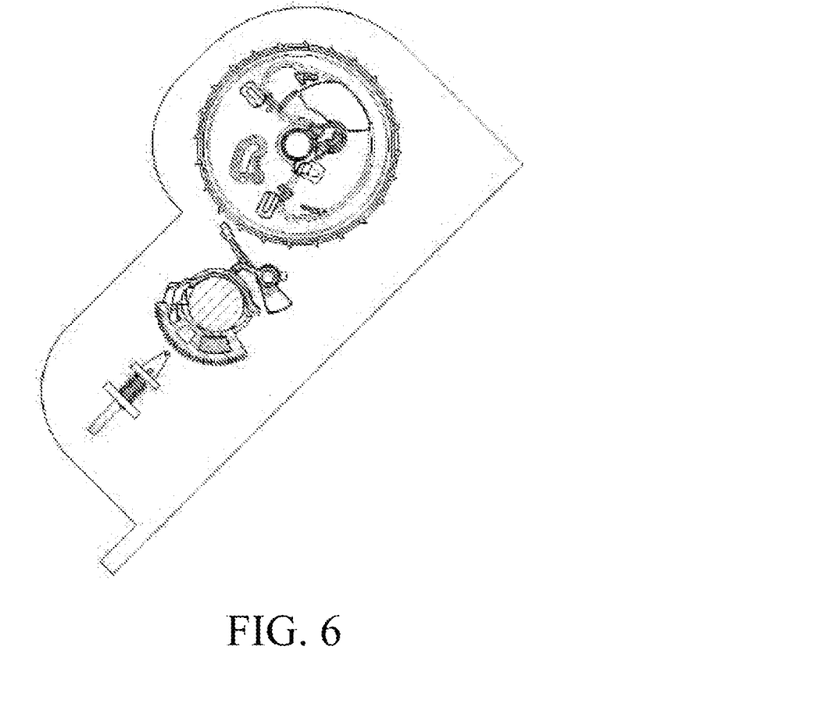
FIG. 6 is a schematic diagram of the relative positions of a locking mechanism, a sensor, a pawl, and a ratchet when a seat back is in a state of tilting backwards and the locking mechanism unlocks a sensing seat.

When the locking mechanism 3 is in the unlocking state, the sensing seat 21 is rotatable relative to the axis of the first pivot shaft 212, and the sensing seat 21 remains in the initial position.

The seat belt retracting and locking apparatus 100 provided by the present invention is used for being mounted in the seat back 301 of an automotive seat 300. The seat belt retracting and locking apparatus 100 includes the seat belt retractor 1, the normally-locked sensor 2, and the locking mechanism 3 for normally locking the sensing seat 21.

The seat belt retractor 1 includes the retractor housing 11, the core shaft 12, the seat belt reel, the ratchet 13, and the pawl 14. The core shaft 12 is mounted on the retractor housing 11. The seat belt reel is sleeved on the core shaft 12. For the mounting means of the seat belt reel, reference may be made to the description of the seat belt reel in the background. When the seat belt reel rotates normally on the core shaft 12, a seat belt may be pulled out normally. When the seat belt reel is restricted to be unable to rotate on the core shaft 12, the seat belt is locked, and can no longer be pulled out.

The ratchet 13 is located outside of the retractor housing 11. The ratchet 13 is sleeved on the core shaft 12. The ratchet 13 is fixedly connected to one end of the seat belt reel. The ratchet 13 and the seat belt reel may synchronously rotate on the core shaft 12. The pawl 14 and the ratchet 13 are located on the same side of the retractor housing 11. The pawl 14 is connected to the retractor housing 11 by means of a second pivot shaft 142. The pawl 14 has the abutting portion 141 extending towards the sensing ball 22. One end of the pawl 14 has teeth for engaging with the ratchet 13.

Figure 9:
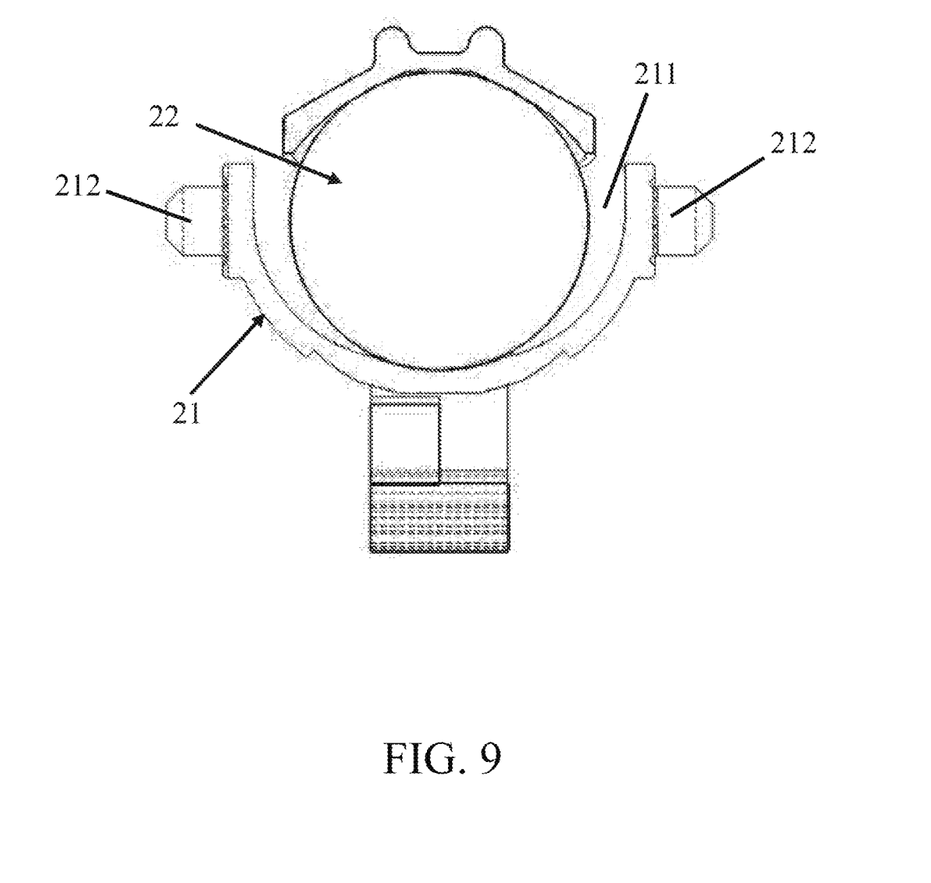
FIG. 9 is a schematic structural diagram of a sensor.

The normally-locked sensor 2 includes the sensing seat 21 and the sensing ball 22.

The sensor 2, the ratchet 13, and the pawl 14 are located on the same side of the retractor housing 11. The pawl 14 is located between the sensor 2 and the ratchet 13.

The first pivot shaft 212 is connected to the sensing seat 21, and extends in the width direction of the seat back 301 (a vehicle width direction). The sensing seat 21 is connected to the retractor housing 11 by means of a first pivot shaft 212.

The sensing seat 21 has the accommodating recess 211. A portion of the sensing ball 22 is located in the accommodating recess 211, and a portion of the sensing ball 22 protrudes from the accommodating recess 211. In a normal state, the abutting portion 141 of the pawl 14 rests on the sensing ball 22.

The locking mechanism 3 is mounted outside of the retractor housing 11, and the locking mechanism 3 and the sensor 2 are located on the same side of the retractor housing 11. In the normal state, the locking mechanism 3 locks the sensing seat 21. When the angle of the seat back 301 is adjusted, the seat belt retractor 1 and the locking mechanism 3 both rotate about a rotary shaft 303 along with the seat back 301.

The sensing seat 21 has the following two means of connection to the first pivot shaft 212:

a first connecting means: the sensing seat 21 is fixed to the first pivot shaft 212, and the first pivot shaft 212 is pivotally connected to the retractor housing 11. When the locking mechanism 3 unlocks the sensing seat 21, the sensing seat 21 and the first pivot shaft 212 rotate as a whole relative to the retractor housing 11.

A second connecting means: the sensing seat 21 is rotatably mounted on the first pivot shaft 212, and the first pivot shaft 212 is fixed on the retractor housing 11. When the locking mechanism 3 unlocks the sensing seat 21, the sensing seat 21 can rotate relative to the first pivot shaft 212.

Regardless of whether the sensing seat 21 is fixedly or rotatably (pivotally) connected to the first pivot shaft 212, when the locking mechanism 3 unlocks the sensing seat 21, the sensing seat 21 can rotate relative to the axis of the first pivot shaft 212.

When the sensor 2 is mounted on the retractor housing 11, the sensing seat 21 has the initial position, and the center of gravity of the sensing seat 21 located in the initial position is located directly below the axis of the first pivot shaft 212, so that the sensing seat 21 remains in a vertical state.

The locking state and the unlocking state of the locking mechanism 3 correspond to a locked state and an adjustable state of the seat back 301. When the seat back 301 is locked, the locking mechanism 3 is in the locking state, and the locking mechanism 3 locks the sensing seat 21. When the angle of the seat back 301 is adjusted, the locking mechanism 3 is in the unlocking state, and the locking mechanism 3 unlocks the sensing seat 21.

A mechanism such as a locking pin, a latch bolt, a bolt, a pushing rod, and a stopping arm may be selected as the locking mechanism 3. Any mechanism capable of locking and unlocking the sensing seat 21 can be considered the locking mechanism 3.

The locking state and the unlocking state of the locking mechanism 3 may be configured to be manual operations as desired, or may be configured to be automatic operations as desired.

When the locking mechanism 3 locks the sensing seat 21, the sensing seat 21 is located in the initial position. In situations such as when a vehicle brakes sharply or tilts, under the action of inertial force, the sensing ball 22 rolls forwards in the accommodating recess 211, and moves upwards along a recess wall on a front side of the accommodating recess 211, thereby pushing up the abutting portion 141 of the pawl 14, so that the pawl 14 rotates about the second pivot shaft 142. A front end of the pawl 14 having teeth turns upwards and engages with the ratchet 13 to lock the ratchet 13, so that the seat belt reel no longer rotates, thereby preventing the seat belt from being pulled out.

Therefore, for the normally-locked sensor apparatus provided by the present invention, the sensing seat 21 is locked in the initial position by the locking mechanism 3 as long as the angle of the seat back 301 is not adjusted, so that the angle and the position of the sensing seat 21 are not affected by a change in the speed of the vehicle.

When the angle of the seat back 301 is adjusted, the seat belt retractor 1 and the locking mechanism 3 rotate about the rotary shaft 303 together with the seat back 301. However, the sensing seat 21 only rotates relative to the axis of the first pivot shaft 212 and always remains in the initial position, and the sensing ball 22 also remains substantially still, so that relative positions between the sensing ball 22, the pawl 14, and the ratchet 13 do not change, thereby improving the stability of the performance of the product.

In one embodiment, as shown in FIGS. 1-6, a counterweight block 213 is mounted in the sensing seat 21, and the counterweight block 213 is located directly below the axis of the first pivot shaft 212.

When the locking mechanism 3 is in the unlocking state, the counterweight block 213 causes the sensing seat 21 to remain in the initial position.

In the present embodiment, the counterweight block 213 is provided in the sensing seat 21, and the counterweight block 213 is located directly below the axis of the first pivot shaft 212, thereby facilitating maintaining the location of the center of gravity of the combination of the sensing seat 21 and the counterweight block 213 directly below the axis of the first pivot shaft 212, helping the sensing seat 21 to remain in the initial position when the locking mechanism 3 is in the unlocking state.

In one embodiment, when the sensing ball 22 is in a static state in the accommodating recess 211, the center of gravity of the sensing ball 22 is located directly above the counterweight block 213, so that the center of gravity of the sensing ball 22 and the center of gravity of the combination of the sensing seat 21 and the counterweight block 213 are located on the same vertical line, facilitating the sensor 2 remaining in a vertical state.

In one embodiment, as shown in FIGS. 2-9, a side of the sensing seat 21 facing away from the accommodating recess 211 is provided with a curved rack 214, and the counterweight block 213 is located between two ends of the curved rack 214.

The locking mechanism 3 is located on one side of the sensing seat 21.

The locking mechanism 3 includes an extensible locking pin 31 and a driving member 32 for driving the locking pin 31 to move towards a side of the sensing seat 21.

An end portion of the locking pin 31 facing the curved rack 214 has locking pin teeth 311.

When the locking pin teeth 311 engage with the curved rack 214, the locking mechanism 3 locks the sensing seat 21.

When the locking pin teeth 311 are separated from the curved rack 214, the locking mechanism 3 unlocks the sensing seat 21.

In the present embodiment, the bottom of the sensing seat 21 is provided with the curved rack 214, and the curved rack 214 and the sensing seat 21 may be integrally formed. The counterweight block 213 is located between the two ends of the curved rack 214. That is, the center of gravity of the combination of the sensing seat 21 and the counterweight block 213 is located between the two ends of the curved rack 214.

The locking mechanism 3 is located on one side of the sensing seat 21 facing away from the sensing ball 22. The locking mechanism 3 includes the extensible locking pin 31 and the driving member 32. The locking pin 31 extends towards the curved rack 214, and the end portion of the locking pin 31 has the locking pin teeth 311. The driving member 32 is used for driving the locking pin 31 to move towards the side of the sensing seat 21, so as to cause the locking pin teeth 311 to engage with the curved rack 214. The driving member 32 may be a member capable of driving the locking pin 31 to move rectilinearly, such as an elastic member, a cylinder, and a motor.

The locking mechanism 3 includes a support 33. The locking pin 31 traverses a through hole on the support 33, and can slide relative to the support 33. The locking pin 31 has a connecting plate 34, and the driving member 32 is connected between the support 33 and the connecting plate 34.

In the normal state, the seat back 301 is locked. The driving member 32 drives the locking pin 31 to move towards a side of the curved rack 214, and causes the locking pin teeth 311 to engage with the curved rack 214, and at such time, the locking mechanism 3 locks the sensing seat 21.

When the angle of the seat back 301 needs to be adjusted, an operation may be performed to cause the locking pin 31 to leave the curved rack 214. At such time, the locking mechanism 3 unlocks the sensing seat 21. Specifically, the locking pin 31 may be caused to leave the curved rack 214 by means of turning off the driving member, or resetting the driving member, or manually pulling the locking pin 31, or the like.

When the locking pin 31 rotates along with the seat back 301, the distance between the locking pin 31 and the curved rack 214 does not change, thereby facilitating control of mating or separation between the locking pin 31 and the curved rack 214.

In one embodiment, the driving member 32 is an elastic element 321.

When the elastic element 321 is in a compressed state, the locking pin 31 is separated from the curved rack 214.

When the elastic element 321 is in a released state, the locking pin 31 mates with the curved rack 214.

In the present embodiment, the driving member 32 is the elastic element 321, such as an expansion spring, or an elastic piece, or the like, thereby facilitating operation.

In the normal state, the elastic element 321 is released or spread to push up the connecting plate 24, thereby driving the locking pin 31 to mate with the curved rack 214.

When the angle of the seat back 301 needs to be adjusted, the locking pin 31 is pulled to overcome an acting force of the elastic element 321, or the elastic element 321 is compressed by means of an electromagnetic mechanism, so that the locking pin 31 is separated from the curved rack 214.

Figure 10:
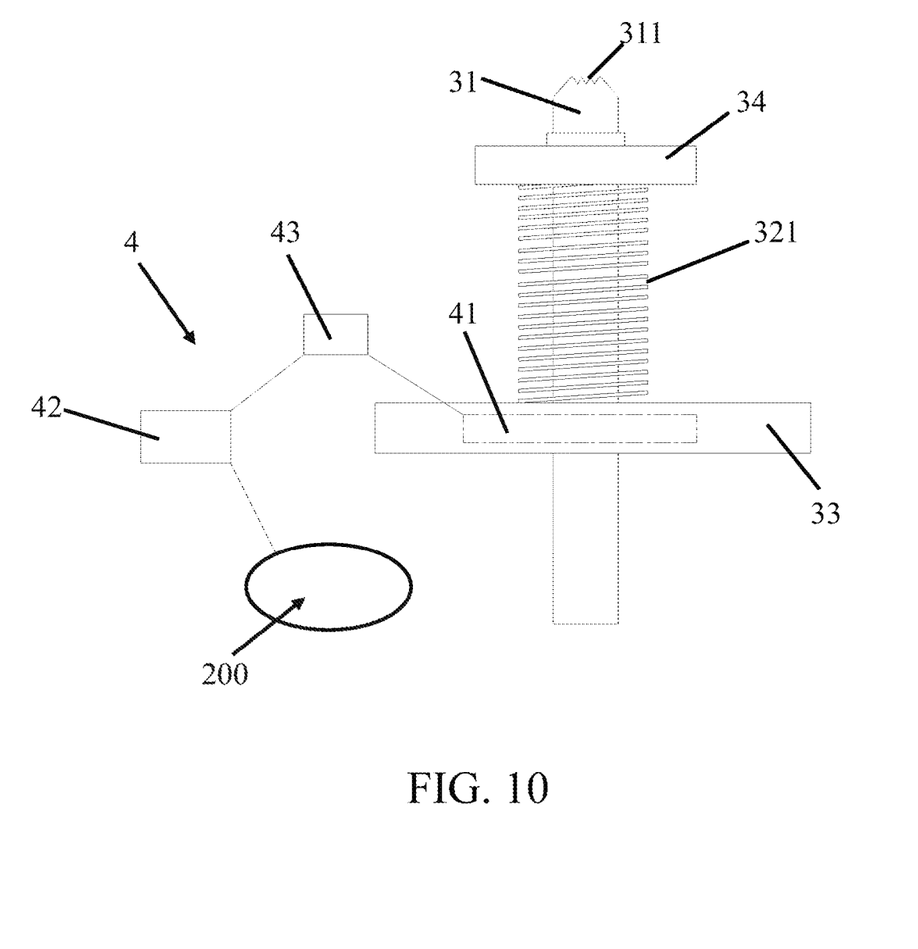
FIG. 10 is a schematic diagram of an electromagnetic actuator, a locking pin, and an elastic element.

In one embodiment, as shown in FIG. 10, the seat belt retracting and locking apparatus 100 further includes an electromagnetic actuator 4 for driving the elastic element 321 to switch between the compressed state and the released state.

The electromagnetic actuator 4 includes an electromagnet 41 capable of compressing the elastic element 321 when powered on and a controller 42 for being connected to a vehicle computer 200 and capable of controlling the electromagnet 41 to be powered on and off.

In the normal state, the electromagnet 41 is in a powered-off state, and the elastic element 321 is in the released state.

When the controller 42 receives an angle adjustment signal of the seat back transmitted by the vehicle computer 200, the controller 42 controls the electromagnet 41 to be powered on, and causes the elastic element 321 to be in the compressed state.

The electromagnetic actuator 4 in the present embodiment is applicable to a button-type, key-type, or touch-type seat back adjustment switch. The electromagnetic actuator 4 includes the electromagnet 41, the controller 42, and a circuit board 43. The electromagnet 41 and the controller 42 are respectively connected to the circuit board 43. The electromagnet 41 may be mounted in the support 33. The circuit board 43 is used for supplying power to the electromagnet 41. The controller 42 may the electromagnet 41 to be powered on and off by means of controlling a circuit to be powered on and off. The vehicle computer 200 can monitor the operating state of a motor in an electrically adjustable seat, the state of a seat locking pin, user operations, and the like by means of sensors. Generally, when a user does not choose to adjust the seat back 301, the seat back 301 is always considered by default to be in the locked state (the normal state). The controller 42 may control the circuit to be powered off, and the electromagnet 41 is powered off. The electromagnet 41 in the normal state is in the powered-off state. At such time, the electromagnet 41 does not exert an attraction force on the elastic element 321, and the elastic element 211 is in a released or spread or expanded state, and can drive the locking pin 31 to extend out and mate with the curved rack 214. When the user chooses to adjust the seat back 301, the vehicle computer 200 transmits to the controller 42 an angle adjustment signal of the seat back. The controller 42 controls the circuit to be closed, and the electromagnet 41 is powered on. The electromagnet 41 that is powered on generates a magnetic field to attract the elastic element 321, so that the elastic element 321 is compressed, and the locking pin 31 can be pulled to be separated from the curved rack 214.

Figure 11:
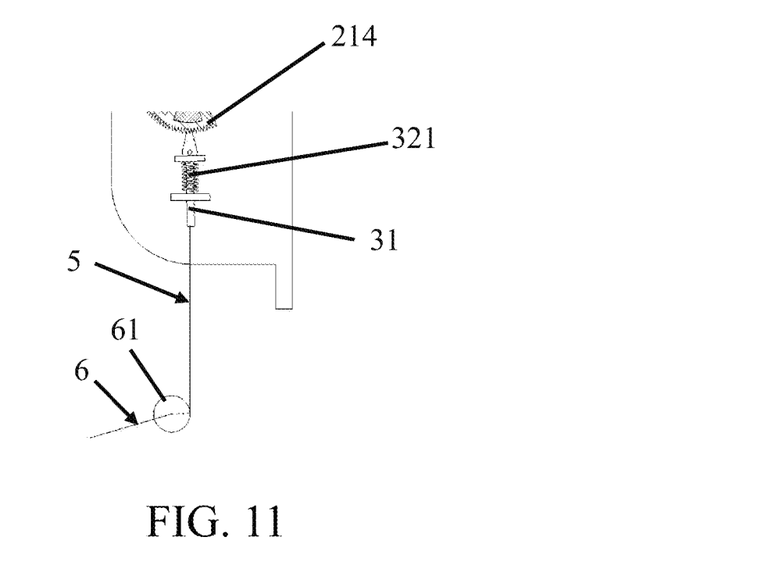
FIG. 11 is a schematic diagram of a locking pin mated with a curved rack when a seat adjuster is in a locked state and an elastic element is in a released state.
Figure 12:
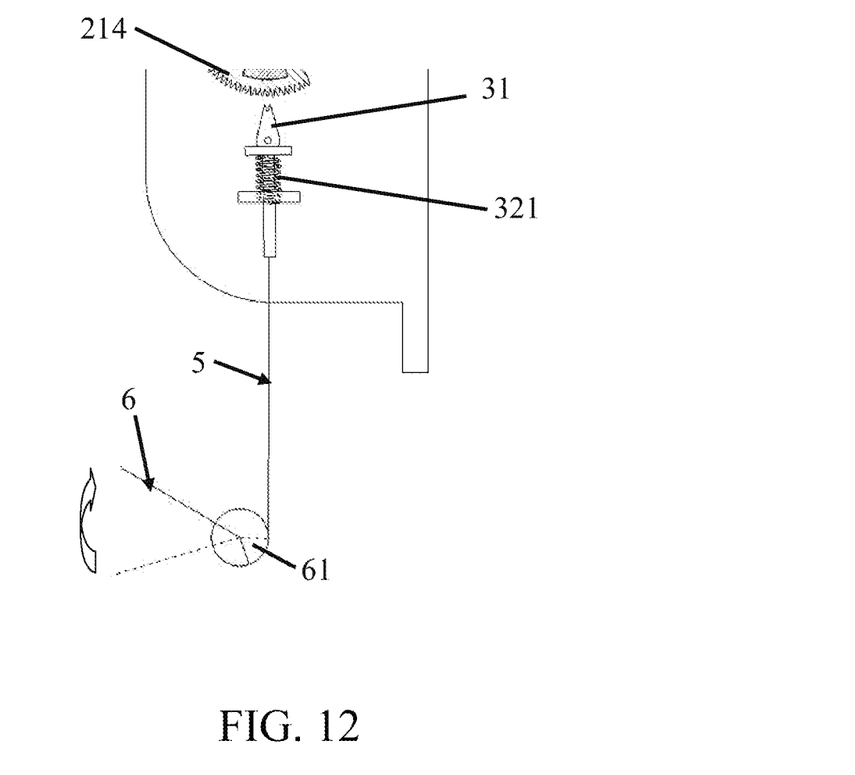
FIG. 12 is a schematic diagram of a pulling cord pulling a locking pin to leave a curved rack and causing an elastic element to be compressed when a seat adjuster is in an unlocked state.

In one embodiment, as shown in FIGS. 11-12, the seat belt retracting and locking apparatus 100 further includes a pulling cord 5 for being connected between a rotation shaft 61 of a seat adjuster 6 and the locking pin 31.

When the seat adjuster 6 is in a locked state, the elastic element 321 is in the released state, and the locking pin 31 mates with the curved rack 214.

When the seat adjuster 6 is in an unlocked state, the pulling cord 5 pulls the locking pin 31 to leave the curved rack 214 and causes the elastic element 321 to be in the compressed state.

The pulling cord 5 in the present embodiment is applicable to a handle-type seat back adjustment switch having a rotation shaft.

The seat adjuster 6 may be a handle, a rocker, or the like, and has the rotation shaft 61. One end of the pulling cord 5 is connected to the locking pin 31, and the other end thereof is wound around the rotation shaft 61. The rotation shaft 61 may be mounted on the rotary shaft 303 of the seat back 301 and a seat cushion 302.

When the seat adjuster 6 is in the locked state or a locked position (the normal state), the seat back 301 is locked, and the pulling cord 5 does not act on the locking pin 31. The elastic element 211 is in the released or spread or expanded state, and can drive the locking pin 31 to extend out and mate with the curved rack 214. When the seat adjuster 6 is rotated to the unlocked state or an unlocked position, the rotation shaft 61 rotates accordingly and winds the pulling cord 5, and the pulling cord 5 pulls the locking pin 31 and compresses the elastic element 321, so that the locking pin 31 is separated from the curved rack 214.

In one embodiment, as shown in FIGS. 3-8, the curved rack 214 has a first end 2141 and a second end 2142 arranged opposite each other.

The distance between the counterweight block 213 and the first end 2141 is less than the distance between the counterweight block 213 and the second end 2142.

When the seat back 301 is in a vertical state, the locking pin 31 is located below the curved rack 214 and faces the counterweight block 213.

Figure 7:
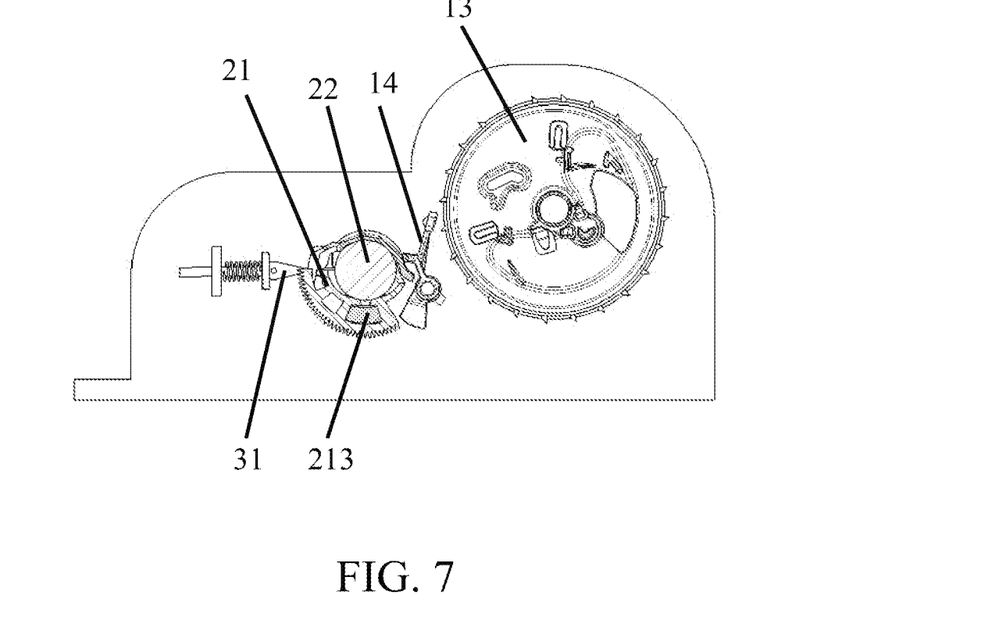
FIG. 7 is a schematic diagram of the relative positions of a locking mechanism, a sensor, a pawl, and a ratchet when a seat back is in a state of being laid down backwards to be horizontal and the locking mechanism locks a sensing seat.
Figure 8:
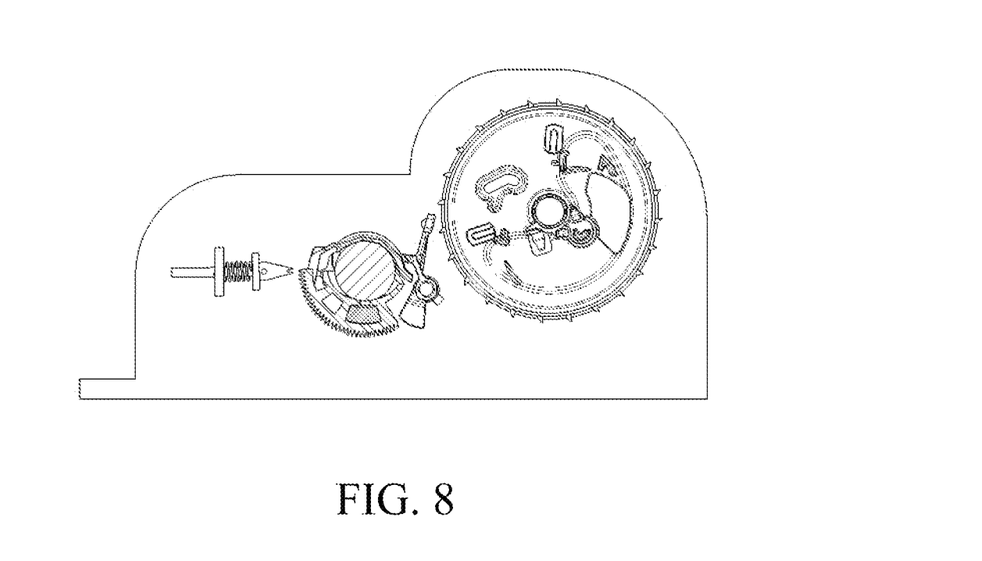
FIG. 8 is a schematic diagram of the relative positions of a locking mechanism, a sensor, a pawl, and a ratchet when a seat back is in a state of being laid down backwards to be horizontal and the locking mechanism unlocks a sensing seat.

When the seat back 301 is in a state of being laid down backwards to be horizontal, the locking pin 31 is located on a front side of the curved rack 214 and faces the second end 2142.

The first end 2141 is a rear end of the curved rack 214, and the second end 2142 is a front end of the curved rack 214. The closer the counterweight block 213 is to the first end 2141, the smaller the length of the curved rack 214 may be.

Assuming that the radius of the curved rack 214 is r, the seat back 301 is enabled to be adjusted backwards by 90° from the vertical state as long as the curved rack 214 is slightly longer than the arc of $\frac{1}{2}\pi r$.

In one embodiment, the pawl 14 is connected to the retractor housing 11 by means of the second pivot shaft 142. The first pivot shaft 212 is parallel to the rotary shaft 303 of the seat back 301, and the second pivot shaft 142 and the core shaft 12 are respectively parallel to the first pivot shaft 212, thereby facilitating product structure arrangement and causing the sensing seat 21 to remain perpendicular to the vehicle width direction, and not oscillate in the vehicle width direction, facilitating the sensor 2 remaining in the vertical state.

As shown in FIGS. 13-16, an automotive seat 300 provided by an embodiment of the present invention includes a seat back 301 and the seat belt retracting and locking apparatus 100 according to any one of the foregoing embodiments.

Figure 13:
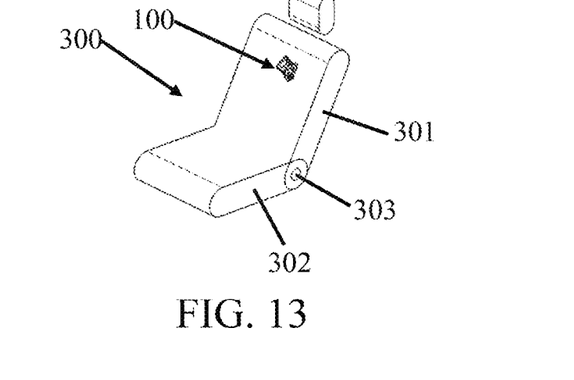
FIG. 13 is a schematic diagram of a seat belt retracting and locking apparatus mounted in a seat back.
Figure 14:
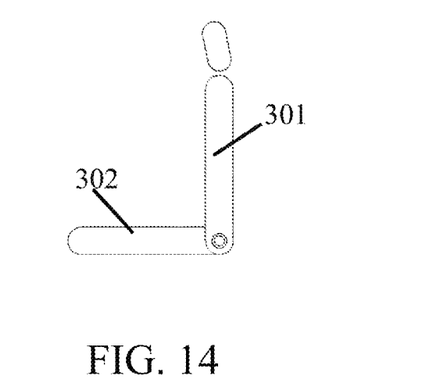
FIG. 14 is a schematic diagram of a seat back in a vertical state.
Figure 15:
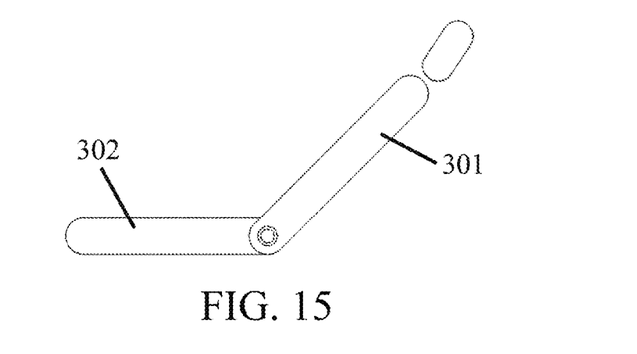
FIG. 15 is a schematic diagram of a seat back in a state of tilting backwards.
Figure 16:
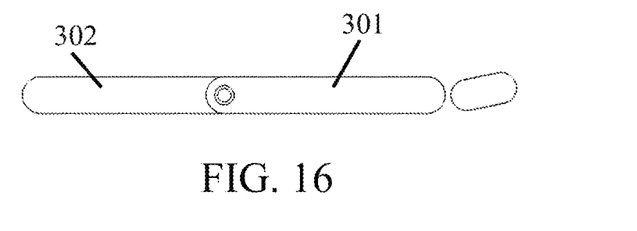
FIG. 16 is a schematic diagram of a seat back in a state of being laid down backwards to be horizontal.

The retractor housing 11 is fixedly connected to a backrest frame of the seat back 301.

When the seat back 301 is locked, the locking mechanism 3 locks the sensing seat 21.

When the angle of the seat back 301 is adjusted, the locking mechanism 3 unlocks the sensing seat 21.

The automotive seat 300 provided by the present invention includes the seat back 301, the seat cushion 302, the rotary shaft 303, and the seat belt retracting and locking apparatus 100.

For the structure, configurations, and working principle of the seat belt retracting and locking apparatus 100, please refer to the foregoing description of the seat belt retracting and locking apparatus 100. Details will not be described herein again.

The seat back 301 is connected to the seat cushion 302 by means of the rotary shaft 303. The seat back 301 can rotate about the rotary shaft 303 relative to the seat cushion 302 so as to be adjusted. For the adjustment means and the adjustment mechanism of the seat back 301, reference may be made to content in the prior art.

The locking state and the unlocking state of the locking mechanism 3 correspond to a locked state and an adjustable state of the seat back 301. When the seat back 301 is locked, the locking mechanism 3 is in the locking state, and the locking mechanism 3 locks the sensing seat 21. When the angle of the seat back 301 needs to be or is adjusted, the locking mechanism 3 is in the unlocking state, and the locking mechanism 3 unlocks the sensing seat 21.

Therefore, for the automotive seat 300 provided by the present invention, the sensing seat 21 is locked in the initial position by the locking mechanism 3 as long as the angle of the seat back 301 is not adjusted, so that the angle and the position of the sensing seat 21 are not affected by a change in the speed of the vehicle.

When the angle of the seat back 301 is adjusted, the seat belt retractor 1 and the locking mechanism 3 rotate together with the seat back 301. However, the sensing seat 21 only rotates relative to the axis of the first pivot shaft 212, and always remains in the initial position, and the sensing ball 22 also remains substantially still, so that relative positions between the sensing ball 22, the pawl 14, and the ratchet 13 do not change, thereby improving the stability of the performance of the product.

Depending on the requirements, the above technical solutions can be combined to achieve an optimal technical effect.

The above description is merely illustrative of the principles and preferred examples of the present invention. It should be noted that other variations can be made by those of ordinary skill in the art on the basis of the principles of the present invention, and such variations should be construed as falling within the scope of protection of the present invention.

The invention claimed is:

1. A seat belt retracting and locking apparatus for being mounted in a seat back, comprising: a seat belt retractor, a sensor having a sensing seat and a sensing ball, and a locking mechanism for locking the sensing seat, the seat belt retractor comprising a retractor housing for being connected to a backrest frame of the seat back, a core shaft mounted on the retractor housing, a seat belt reel sleeved on the core shaft, a ratchet located outside of the retractor housing and synchronously rotating with the seat belt reel, and a pawl pivotally mounted outside of the retractor housing and capable of being triggered by the sensing ball to lock the ratchet, the sensing seat being connected to the retractor housing by means of a first pivot shaft, the sensing seat having an accommodating recess, the sensing ball being at least partially located in the accommodating recess, an abutting portion of the pawl resting on the sensing ball, the sensing seat having an initial position, the center of gravity of the sensing seat in the initial position being located directly below the axis of the first pivot shaft, a counterweight block is mounted in the sensing seat, the counterweight block being located directly below the axis of the first pivot shaft, wherein one side of the sensing seat facing away from the accommodating recess is provided with a curved rack, and the counterweight block is located between two ends of the curved rack, and the locking mechanism being mounted on the retractor housing, and being located on one side of the sensor, the locking mechanism being located on one side of the sensing seat, the locking mechanism comprising an extensible locking pin and a driving member for driving the locking pin to move towards one side of the sensing seat configured for engaging the curved rack, wherein the locking mechanism has a locking state of locking the sensing seat when the seat back is locked and an unlocking state of unlocking the sensing seat when the angle of the seat back is adjusted, when the locking mechanism is in the locking state, the sensing seat being fixed in the initial position, and when the locking mechanism is in the unlocking state, the sensing seat being rotatable relative to the axis of the first pivot shaft, and the sensing seat remaining in the initial position.

2. The seat belt retracting and locking apparatus according to claim 1, wherein when the locking mechanism is in the unlocking state, the counterweight block causes the sensing seat to remain in the initial position.

3. The seat belt retracting and locking apparatus according to claim 2, wherein when the sensing ball is in a static state in the accommodating recess, the center of gravity of the sensing ball is located directly above the counterweight block.

4. The seat belt retracting and locking apparatus according to claim 1, wherein an end portion of the locking pin is formed with locking pin teeth and faces the curved rack, when the locking pin teeth engage with the curved rack, the locking mechanism locks the sensing seat, and when the locking pin teeth are separated from the curved rack, the locking mechanism unlocks the sensing seat.

5. The seat belt retracting and locking apparatus according to claim 4, wherein the driving member is an elastic element, when the elastic element is in a compressed state, the locking pin being separated from the curved rack, and when the elastic element is in a released state, the locking pin mating with the curved rack.

6. The seat belt retracting and locking apparatus according to claim 5, wherein the seat belt retracting and locking apparatus further comprises an electromagnetic actuator for driving the elastic element to switch between the compressed state and the released state, the electromagnetic actuator comprising an electromagnet capable of compressing the elastic element when powered on and a controller for being connected to a vehicle computer and capable of controlling the electromagnet to be powered on and off, in a normal state, the electromagnet being in a powered-off state, and the elastic element being in the released state, and when the controller receives an angle adjustment signal of the seat back transmitted by the vehicle computer, the controller controlling the electromagnet to be powered on, and causing the elastic element to be in the compressed state.

7. The seat belt retracting and locking apparatus according to claim 5, wherein the seat belt retracting and locking apparatus further comprises a pulling cord for being connected between a rotation shaft of a seat adjuster and the locking pin, when the seat adjuster is in a locked state, the elastic element being in the released state, and the locking pin mating with the curved rack, and when the seat adjuster is in an unlocked state, the pulling cord pulling the locking pin to leave the curved rack, and causing the elastic element to be in the compressed state.

8. The seat belt retracting and locking apparatus according to claim 4, wherein the curved rack has a first end and a second end arranged opposite each other, the distance between the counterweight block and the first end being less than the distance between the counterweight block and the second end, when the seat back is in a vertical state, the locking pin being located below the curved rack and facing the counterweight block, and when the seat back is in a state of being laid down backwards to be horizontal, the locking pin being located on a front side of the curved rack and facing the second end.

9. The seat belt retracting and locking apparatus according to claim 1, wherein the pawl is connected to the retractor housing by means of a second pivot shaft, the first pivot shaft being parallel to a rotary shaft of the seat back, and the second pivot shaft and the core shaft being respectively parallel to the first pivot shaft.

10. An automotive seat, comprising the seat back and the seat belt retracting and locking apparatus according to claim 1, the retractor housing being fixedly connected to a backrest frame of the seat back, when the seat back is locked, the locking mechanism locking the sensing seat, and when the angle of the seat back is adjusted, the locking mechanism unlocking the sensing seat.

11. An automotive seat, comprising the seat back and the seat belt retracting and locking apparatus according to claim 2, the retractor housing being fixedly connected to a backrest frame of the seat back, when the seat back is locked, the locking mechanism locking the sensing seat, and when the angle of the seat back is adjusted, the locking mechanism unlocking the sensing seat.

12. An automotive seat, comprising the seat back and the seat belt retracting and locking apparatus according to claim 3, the retractor housing being fixedly connected to a backrest frame of the seat back, when the seat back is locked, the locking mechanism locking the sensing seat, and when the angle of the seat back is adjusted, the locking mechanism unlocking the sensing seat.

13. An automotive seat, comprising the seat back and the seat belt retracting and locking apparatus according to claim 4, the retractor housing being fixedly connected to a backrest frame of the seat back, when the seat back is locked, the locking mechanism locking the sensing seat, and when the angle of the seat back is adjusted, the locking mechanism unlocking the sensing seat.

14. An automotive seat, comprising the seat back and the seat belt retracting and locking apparatus according to claim 5, the retractor housing being fixedly connected to a backrest frame of the seat back, when the seat back is locked, the locking mechanism locking the sensing seat, and when the angle of the seat back is adjusted, the locking mechanism unlocking the sensing seat.

15. An automotive seat, comprising the seat back and the seat belt retracting and locking apparatus according to claim 6, the retractor housing being fixedly connected to a backrest frame of the seat back, when the seat back is locked, the locking mechanism locking the sensing seat, and when the angle of the seat back is adjusted, the locking mechanism unlocking the sensing seat.

16. An automotive seat, comprising the seat back and the seat belt retracting and locking apparatus according to claim 7, the retractor housing being fixedly connected to a backrest frame of the seat back, when the seat back is locked, the locking mechanism locking the sensing seat, and when the angle of the seat back is adjusted, the locking mechanism unlocking the sensing seat.

17. An automotive seat, comprising the seat back and the seat belt retracting and locking apparatus according to claim 8, the retractor housing being fixedly connected to a backrest frame of the seat back, when the seat back is locked, the locking mechanism locking the sensing seat, and when the angle of the seat back is adjusted, the locking mechanism unlocking the sensing seat.

18. An automotive seat, comprising the seat back and the seat belt retracting and locking apparatus according to claim 9, the retractor housing being fixedly connected to a backrest frame of the seat back, when the seat back is locked, the locking mechanism locking the sensing seat, and when the angle of the seat back is adjusted, the locking mechanism unlocking the sensing seat.

* * * * *